United States Patent [19]

Borchardt

[11] Patent Number: 4,563,292

[45] Date of Patent: Jan. 7, 1986

[54] METHODS FOR STABILIZING FINES CONTAINED IN SUBTERRANEAN FORMATIONS

[75] Inventor: John K. Borchardt, Duncan, Okla.

[73] Assignee: Halliburton Company, Duncan, Okla.

[21] Appl. No.: 636,943

[22] Filed: Aug. 2, 1984

[51] Int. Cl.$^4$ .................... E21B 43/12; E21B 43/25
[52] U.S. Cl. ................. 252/8.55 R; 166/275; 166/307; 166/305.1; 252/8.55 C; 405/264
[58] Field of Search ............ 252/8.55 R, 8.55 C, 252/8.55 D; 166/275, 307, 305 R; 405/264

[56] References Cited

U.S. PATENT DOCUMENTS

| | | |
|---|---|---|
| 3,057,798 | 10/1962 | Knox . |
| 3,349,032 | 10/1967 | Krieg . |
| 3,434,971 | 3/1969 | Atkins . |
| 3,494,865 | 2/1970 | Andrews et al. . |
| 3,562,226 | 2/1971 | Gayley . |
| 3,704,750 | 12/1972 | Miles et al. . |
| 3,744,566 | 7/1973 | Szabo et al. ..................... 252/8.55 |
| 3,794,117 | 2/1974 | Knox et al. . |
| 3,827,977 | 8/1974 | Miles . |
| 3,832,302 | 8/1974 | Lansford et al. . |
| 3,868,328 | 2/1975 | Boothe et al. . |
| 3,916,994 | 11/1975 | Maddox, Jr. et al. . |
| 3,916,995 | 11/1975 | Shupe et al. . |
| 3,916,996 | 11/1975 | Shupe et al. . |
| 3,927,718 | 12/1975 | Tate et al. . |
| 3,943,060 | 3/1976 | Martin et al. . |
| 3,962,332 | 6/1976 | Trapasso . |
| 4,055,502 | 10/1977 | Swanson . |
| 4,062,796 | 12/1977 | Gardner et al. . |
| 4,079,011 | 3/1978 | Tate . |
| 4,152,274 | 5/1979 | Phillips et al. . |
| 4,158,521 | 6/1979 | Anderson et al. . |
| 4,200,151 | 4/1980 | Tate . |
| 4,200,154 | 4/1980 | Tate . |
| 4,206,058 | 6/1980 | Tate . |
| 4,366,071 | 12/1982 | McLaughlin et al. . |
| 4,366,072 | 12/1982 | McLaughlin et al. . |
| 4,366,073 | 12/1982 | McLaughlin et al. . |
| 4,366,074 | 12/1982 | McLaughlin et al. . |
| 4,374,739 | 2/1983 | McLaughlin et al. ............ 252/8.55 |
| 4,393,939 | 7/1984 | Smith et al. . |
| 4,447,342 | 5/1984 | Borchardt et al. . |
| 4,460,483 | 7/1984 | Weaver . |
| 4,462,718 | 7/1984 | McLaughlin et al. . |
| 4,484,631 | 11/1984 | Sherwood et al. ............ 252/8.55 X |

*Primary Examiner*—Herbert B. Guynn
*Attorney, Agent, or Firm*—Thomas R. Weaver; Edward F. Sherer

[57] ABSTRACT

A method of preventing or reducing the migration of fines in a permeable structure comprising contacting the fines with organic copolymers which can be either nonionic in a neutral media or can contain up to 95% by weight of a quaternary ammonium salt monomer.

19 Claims, No Drawings

METHODS FOR STABILIZING FINES CONTAINED IN SUBTERRANEAN FORMATIONS

BACKGROUND OF THE INVENTION

This invention relates to a method of treating a permeable structure such as a subterranean formation using water soluble organic copolymers in order to stabilize, in the structure, migrating fines such as silica, iron minerals, and alkaline earth metal carbonates.

The recovery of fluids such as oil or gas or combinations thereof has been troublesome in areas where the subterranean formation is composed of one or more layers or zones which contain migrating fines such as silica, iron minerals, and alkaline earth metal carbonates. These fines tend to move or migrate to the well bore during the recovery of formation fluids from the particular layers or zones and frequently block the passageways leading to the well bore. The movement or migration of fines to the well bore is a particular problem when the fines are contacted with water foreign to the formation. Plugging or materially impairing the flow of the formation fluids towards the well bore results in a loss of these fluids to the producer and decreases the rate of hydrocarbon recovery from the well which may cause the well to be shut down because it is economically unattractive to produce therefrom. An additional adverse factor resulting from the movement of the fines towards the well bore is that they are often carried along with the formation fluids to the well bore and pass through pipes, pumps, etc., being used to recover the formation fluids to the surface with resulting damage to the moving parts thereof as the fines are very abrasive.

Secondary and tertiary methods of recovering hydrocarbons from a subterranean formation are well known. In general, such a method involves introducing a fluid, such as water, steam, etc., into one or more injection wells which penetrate the formation and forcing the fluid toward one or more offset producing wells. Migrating fines particles during such an operation can decrease the permeability of the formation which may cause a decrease in the rate in which fluid can be injected into the formation which results in a decrease in the rate of hydrocarbon production at the offset production wells.

Migrating fine particles are frequently encountered during acidizing or fracturing operations and during sand consolidation operations. The presence of the fine particles during these operations can result in a decrease in the permeability of the formation which is being treated.

Gravel packing is a widely practiced method of preventing the production of sand from poorly consolidated formations. The migration of fine particles into the gravel pack can greatly reduce the permeability of the gravel pack, which can result in a decrease in the rate of production of hydrocarbons from the formation.

Consequently, in efforts to overcome these problems, various methods have been developed for treating a subterranean formation in order to stabilize portions of the formation containing migrating fines. For instance, U.S. Pat. Nos. 4,366,071; 4,366,072; 4,366,073; 4,366,074; 4,374,739; and 4,460,483 disclose the use of organic polycationic polymers to prevent or reduce the ill effects of swelling clays or migrating fines in subterranean formations. These patents are assigned to the assignee of the present invention and are hereby incorporated by reference.

The present invention provides a method of stabilizing fines within a permeable structure such as a subterranean formation using organic polymers which are effective in reducing the migration of fine particles in the permeable structure. The copolymers can be either nonionic in a neutral media or can contain up to 95% by weight of a quaternary ammonium salt monomer.

SUMMARY OF THE INVENTION

The present invention involves the use of organic copolymers to prevent or reduce the ill effects of migrating fines in a permeable structure such as a permeable earthen formation penetrated by a well bore. The method is carried out by contacting the fines in the permeable structure with an effective amount of certain organic copolymers.

The copolymers which are used in the present invention contain two (binary copolymers) or three (ternary copolymers) different repeating monomer units and are random in nature. That is, the distribution of the repeating monomer units is determined by the concentration and relative reactivity of the monomers which form the repeating monomer units. The monomer units are linked together in a random sequence along the copolymer chain.

The organic copolymers used in the method of the invention are very effective in treating migrating fines such as silica, iron minerals such as hematite, magnetite, lepidocrocite, wuestite, akaganeite, and siderite, and alkaline earth metal carbonates such as calcite and dolomite. The organic copolymers are particularly effective when used to treat permeable structures which contain about 4% by weight migrating fines in the mass of the structure and less than 2% by weight swelling clays. In addition, the copolymers are particularly effective when used in conjunction with an acidizing operation that utilizes a strong mineral acid such as 15 percent by weight hydrochloric acid or mixtures of 3 percent by weight hydrofluoric acid and 12 percent by weight hydrochloric acid. A treatment with the organic copolymers of the present invention is essentially permanent and the copolymers are very resistant to being removed by brines, oils, or acids. Formations exhibit high permeability retention after the formation has been treated with the organic copolymers. Furthermore, the copolymers are very effective over a wide range of temperatures and are particularly effective from about 90° F. to about 200° F. No well shut-in time is required when the organic copolymers are used to carry out the method of the invention.

DETAILED DESCRIPTION OF THE INVENTION

The present invention involves the use of organic copolymers to prevent the migration of fines contained in a permeable structure such as a subterranean formation. The use of the method of the invention results in stabilizing the permeable structure. These fines may or may not be present with clay materials. Preferably, fines are present in the permeable structure in an amount of about 4% by weight of the structure and the clays are present in an amount of less than about 2% by weight of the structure. The organic copolymers which are suitable for use in accordance with this invention have recurring structural units formed in a random fashion of the formula:

FORMULA A

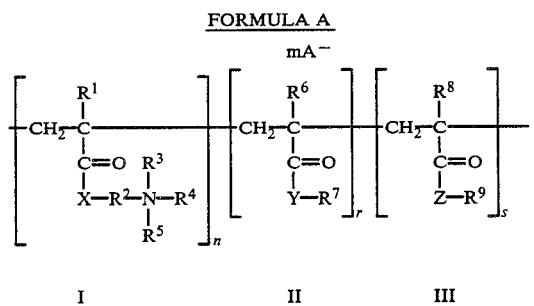

wherein
X is selected from the group consisting of oxygen and NH;
$R^1$, $R^6$, and $R^8$ are independently selected from the group consisting of hydrogen and methyl;
$R^2$ is an alkylene group having 1 to about 4 carbon atoms;
$R^3$ and $R^5$ are independently selected from the group consisting of methyl and ethyl;
$R^4$ is optionally present and when present is selected from the group consisting of:
  (1) an alkyl group having from 1 to about 6 carbon atoms; and
  (2) a quaternary ammonium group having the general formula:

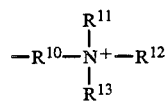

wherein:
$R^{10}$ is selected from the group consisting of an alkylene group having from about 2 to about 6 carbon atoms and a substituted alkylene group having from about 2 to about 6 carbon atoms and containing a hydroxyl group or from 1 to about 3 ether groups;
$R^{11}$, $R^{12}$, and $R^{13}$ are independently selected from the group consisting of methyl and ethyl;
Y is selected from the group consisting of oxygen and $NR^{16}$ wherein $R^{16}$ is selected from the group consisting of hydrogen, methyl and ethyl;
$R^7$ is selected from the group consisting of an alkyl group having from 1 to about 3 carbon atoms; and,

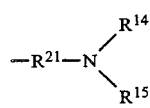

wherein:
$R^{14}$ and $R^{15}$ are independently selected from the group consisting of methyl and ethyl; and,
$R^{21}$ is selected from the group consisting of methylene, ethylene, and trimethylene;
$R^9$ is selected from the group consisting of hydrogen, an alkyl group containing 1 to about 4 carbon atoms, a substituted alkyl group having from 1 to about 4 carbon atoms and containing a hydroxyl group, a carboxyl group, or —$SO_3J$ wherein J is selected from the group consisting of hydrogen, sodium and potassium, and

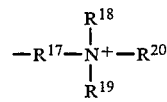

wherein
$R^{17}$ is selected from the group consisting of methylene, ethylene, and trimethylene; and
$R^{18}$, $R^{19}$, and $R^{20}$ are independently selected from the group consisting of methyl and ethyl;
Z is selected from the group consisting of oxygen and NH and provided further when Z is oxygen, $R^9$ may further be selected from the group consisting of sodium and potassium; and,
A is an anion selected from the group consisting of chloride, bromide, iodide, methyl sulfate, and sulfate;
m is an integer equal to the number of anions required to maintain electronic neutrality;
n, r, and s are integers the sum of which equals the total number of monomer units in the copolymer required to give a molecular weight in the range of from about 50,000 to about 1,000,000; and,
monomer unit I is present in the range of from about 25 to about 25 mole percent of the copolymer;
monomer unit II is present in the range of from about 5 to about 75 mole percent of the copolymer; and,
monomer unit III is present in the range of from about 0 to about 35 mole percent of the copolymer.

A preferred organic copolymer of Formula A which is nonionic in character comprises an organic copolymer having recurring structure units formed in a random fashion of the formula:

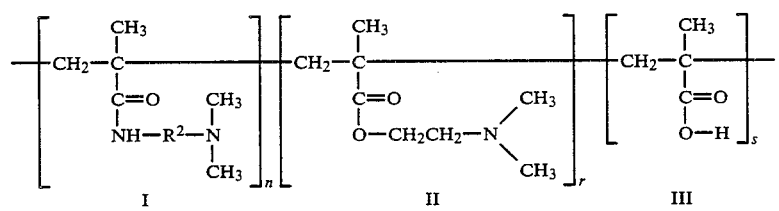

FORMULA B wherein
$R^2$ is selected from the group consisting of ethylene and methylene.

A preferred polycationic organic copolymer of Formula A comprises an organic copolymer having recurring structural units formed in a random fashion of the formula:

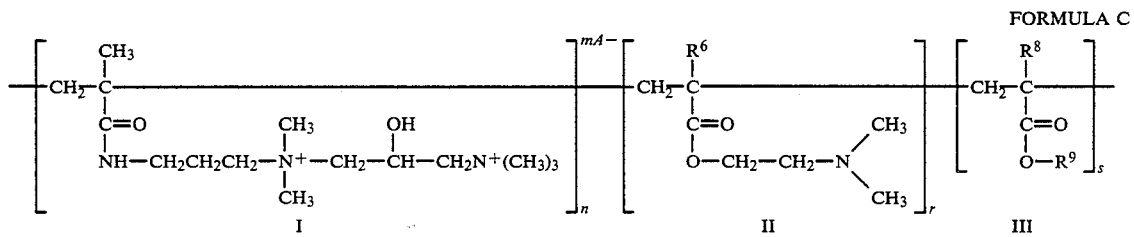

FORMULA C wherein:
R[6] and R[8] are independently selected from the group consisting of hydrogen and methyl;
R[9] is selected from the group consisting of hydrogen and sodium;
A is selected from the group consisting of chloride, bromide, iodide, methyl sulfate and sulfate; and,
m is an integer equal to the number of anions required to maintain electronic neutrality.

The organic copolymers of the present invention can be used to treat both natural and artificial structures which are permeable, including poorly consolidated and unconsolidated rocks. The method of the invention is particularly suited for stabilizing fine particles having a diameter of less than 10 microns. Furthermore, there is a wide range of application for the organic copolymers. These applications involve using the organic copolymers alone as the primary treating agent, or as an auxiliary in other treatments.

Examples of monomer unit I which are suitable in the method of the present invention include dimethylaminoethyl methacrylate, the methyl chloride salt of dimethylaminoethyl methacrylate, and methacrylamido-4,4,8,8-tetramethyl-4,8 diaza-6-hydroxynonamethylene dichloride (MDTHD).

Monomer unit I is preferably present in the copolymer in an amount of from about 60 to about 80 mole percent of the copolymer and most preferably is present in an amount of about 70 mole percent.

Examples of monomer unit II which are suitable in the method of the present invention include dimethylaminoethyl methacrylate, dimethylaminopropyl methacrylamide, dimethylamidopropyl methacrylamide, and dimethyl acrylamide.

Monomer unit II is preferably present in the copolymer in an amount of from about 25 to about 35 mole percent of the copolymer and most preferably is present in an amount of about 30 mole percent.

Examples of monomer unit III which are suitable in the method of the present invention include methacrylic acid and 2-acrylamido-2-methylpropane sulfonic acid.

Monomer unit III is preferably present in the copolymer in an amount of from about 0 to about 10 mole percent of the copolymer and most preferably is present in an amount of about 3 mole percent.

Examples of particularly preferred binary copolymers which are suitable for use in the present invention include copolymers containing the following monomer units.

FORMULA D

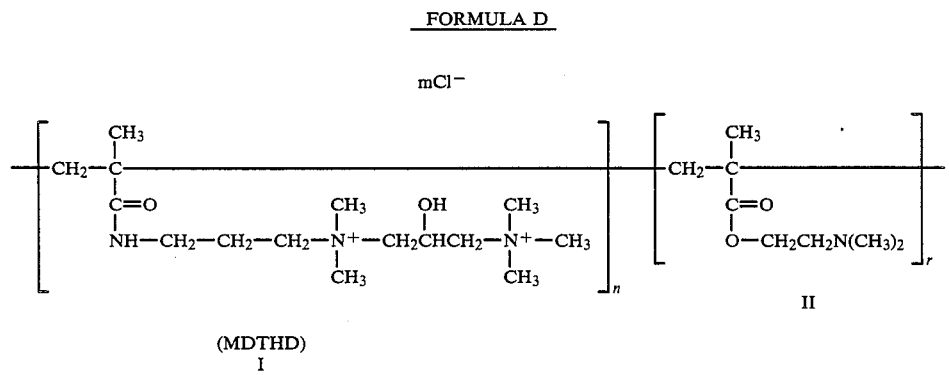

In formula D, monomer unit I is preferably present in an amount of about 66.7 mole percent of the copolymer and monomer unit II is preferably present in an amount of about 33.3 mole percent of the copolymer.

FORMULA E

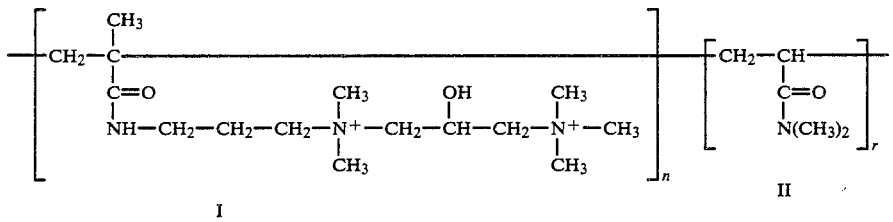

In formula E, monomer unit I is preferably present in an amount of about 66.7 mole percent of the copolymer and monomer unit II is preferably present in an amount of about 33.3 mole percent of the copolymer.

FORMULA F

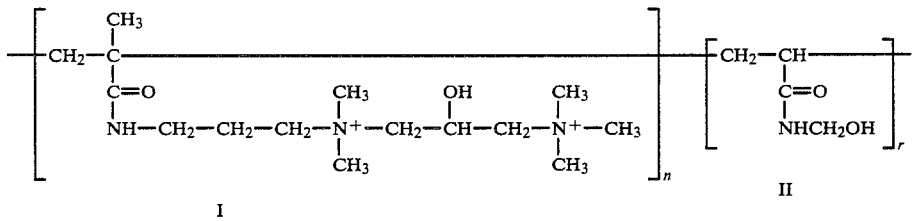

In formula F, monomer unit I is preferably present in an amount of about 90.0 mole percent of the copolymer and monomer unit II is preferably present in an amount of about 10.0 mole percent of the copolymer.

FORMULA G

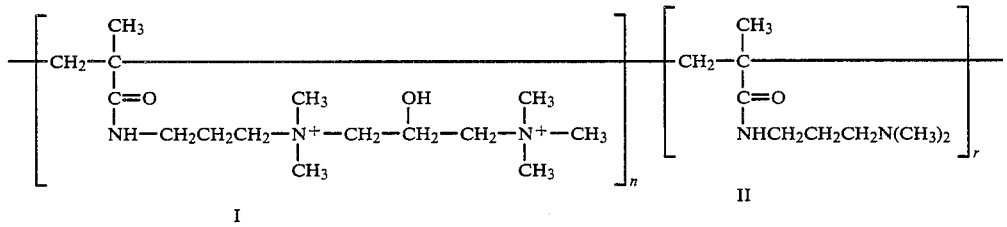

In formula G, monomer unit I is preferably present in an amount of from about 95 mole percent to about 70 mole percent of the copolymer and monomer unit II is preferably present in an amount of from about 30 mole percent to about 5 mole percent of the copolymer.

FORMULA H

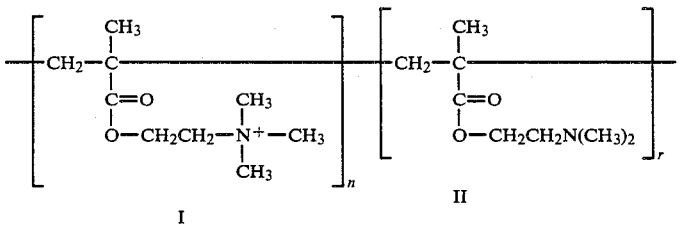

wherein A is chloride or methyl sulfate.

In formula H, monomer unit I is preferably present in an amount of from about 75 mole percent to about 25 mole percent of the copolymer and monomer unit II is preferably present in an amount of from about 25 mole percent to about 75 mole percent of the copolymer.

Examples of particularly preferred ternary copolymers which are suitable for use in the method of the present invention include copolymers containing the following monomer units:

In formula K, monomer unit I and monomer unit II are each preferably present in an amount of about 45.45 mole percent of the copolymer and monomer unit III is preferably present in an amount of 9.1 mole percent of the copolymer and W is

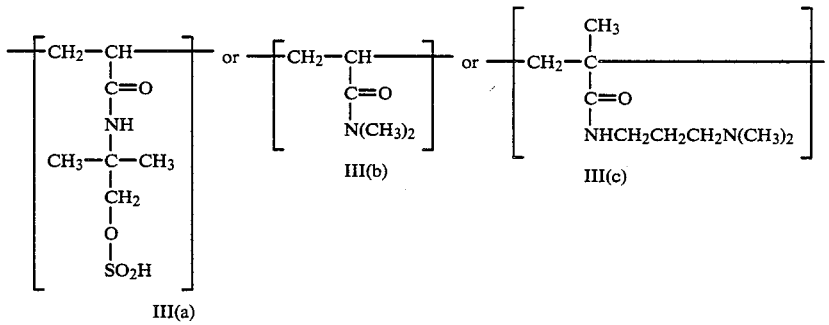

When monomer unit III is III(c) the molar percentages

FORMULA J

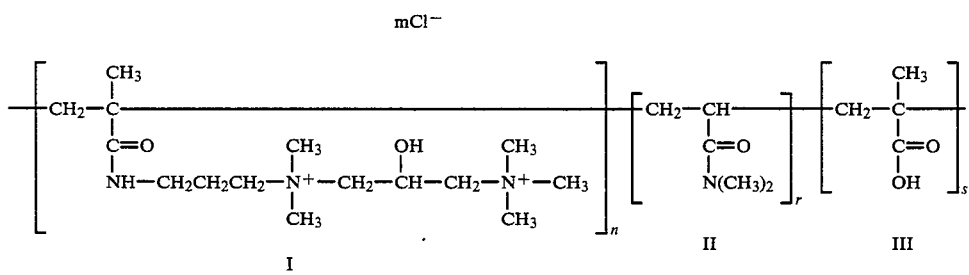

In formula J, monomer unit I is preferably present in an amount of from about 32.3 mole percent to about 64.5 mole percent of the copolymer, monomer unit II is preferably present in an amount of from about 32.3 mole percent to about 64.5 mole percent of the copolymer, and monomer unit III is preferably present in an amount of about 3.2 mole percent of the copolymer.

of monomer units I, II, and III are preferably each about 33.3 mole percent of the copolymer.

An example of a ternary copolymer containing two (2) different quaternary ammonium salt monomer units which is contemplated for use in the method of the present invention comprises a copolymer containing the following monomer units:

FORMULA K

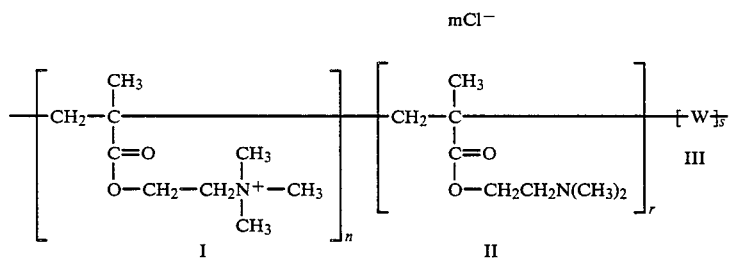

FORMULA L

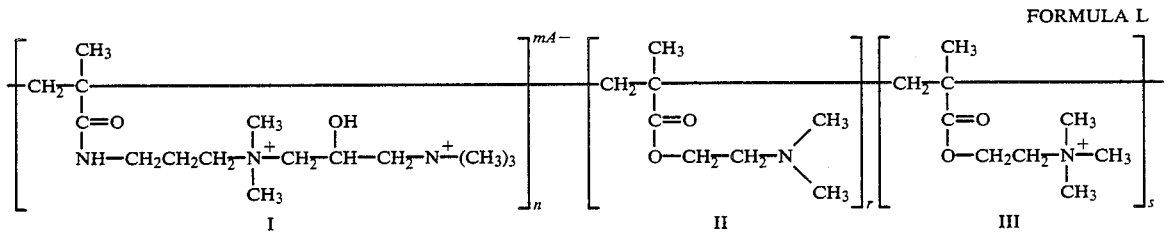

The most preferred copolymer for use in accordance with the present invention comprises a copolymer having the following formula:

FORMULA M

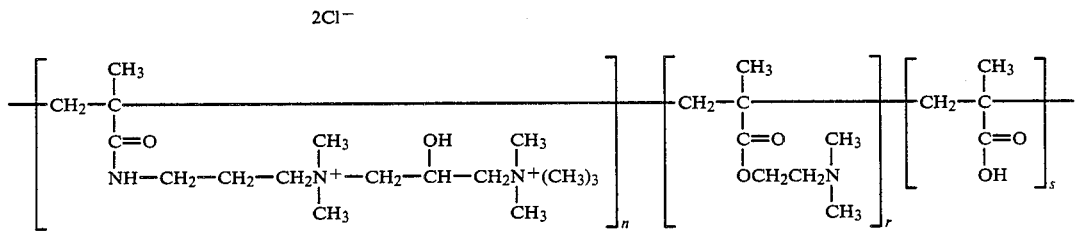

In Formula L, monomer unit I, which is known as methacrylamidopropyl-4,8-diaza-4,4,8,8-tetramethyl-6-hydroxynonamethylene dichloride (MDTHD), is preferably present in an amount of about 70 mole percent of the copolymer; monomer unit II, which is known as dimethylaminoethyl methacrylate, is preferably present in an amount of about 27 mole percent of the copolymer; and monomer unit III, which is known as methacrylic acid is preferably present in an amount of about 3 mole percent of the copolymer.

In Formulae E through M, m, n, r, s, and A have the same meaning as they hold in Formula A above.

The organic copolymers of the present invention should have a molecular weight of from about 50,000 to about 1,000,000. Preferably, the organic copolymers have a molecular weight of about 100,000 to about 400,000 and most preferably about 200,000. The molecular weight of the organic copolymers used in the method of the present invention will vary over a wide range depending upon the permeability of the formation to be treated and the copolymer used in the method of the invention.

An anion selected from the group consisting of chloride, bromide, iodide, methyl sulfate and sulfate is present when the organic copolymer is cationic such as when monomer unit I or monomer unit III or monomer units I and III of the copolymer contain one or more quaternary amine groups and the anion is present in an amount sufficient to maintain electronic neutrality.

The amount of organic copolymer employed in the method of the present invention will vary according to, for example, the size and porosity of the particular formation and the types of fines present. Therefore, there are no upper or lower limits in this regard.

Any suitable method of application can be used to carry out the method of the invention. For some applications such as surface or exposed structures, it may be desirable to merely spray the polymer onto the permeable mass. The essential feature is contact between the fines to be treated and the organic copolymer.

When a carrier fluid is used to carry out the method of the invention, the organic copolymers will generally be present in the carrier fluid in a concentration within the range of from about 0.01% to about 5.0% by weight of the carrier fluid. Lower or higher concentrations can be used, but are not generally as practical. When a carrier fluid is used, the preferred concentration of the organic copolymers is in the range of from about 0.25 to about 1.00 percent by weight of the carrier fluid.

Carrier fluids which can be used to carry out the method of the present invention include polar and nonpolar fluids. Examples of suitable fluids include water, brine, aqueous mixtures of low molecular weight alcohols, ketones, and monoethers of glycol. Examples of suitable low molecular weight alcohols include methanol, ethanol, and isopropanol. When water is used as the carrier fluid, the carrier fluid can contain other ingredients which do not substantially interfere with the dispersion or dissolution of the organic copolymer in the carrier fluid. Furthermore, the water can be gelled or thickened for certain applications. Examples of ingredients which can be included in the water include salts, mineral acids, low molecular weight organic acids, cationic or nonionic surfactants, and wetting agents. When the copolymer used in the method of the present invention does not contain a cationic monomer unit, the water may also contain an anionic surfactant as the copolymer has an electrical charge which is nonreactive with the electronic charge of the anionic surfactant. Preferably the carrier fluid has a viscosity of less than 10 centipoises. Higher viscosity fluids may be used in certain applications but are not generally very practical due to the pressure and pumping requirements. A preferred aqueous carrier fluid is a saline solution containing about 0.1 to about 40.0 percent by weight of salt. The preferred salt concentration is about 2 to about 12 percent by weight of the solution. The salt can be an alkali metal salt, alkaline earth metal salt, an ammonium salt or mixtures thereof. Suitable anions include halides, such as chloride, bromide, and iodide, sulfates, carbonates, hydroxides, or mixtures thereof. The halides of potassium, sodium, magnesium, calcium, and ammonium and mixtures thereof are preferred due to the economics and solubility. Aqueous acids having a concentration of about 0.1 to about 40.0 percent by weight of the solution can also be utilized in carrying out the method of the invention. Examples of suitable acids include hydrochloric acid, hydrofluoric acid, phosphoric acid, acetic acid, formic acid, citric acid, and mixtures thereof. The preferred acids include about 3 to about 15 percent by weight of hydrochloric acid and a mixture of about 3% by weight hydrofluoric acid and about 12% by weight of hydrochloric acid.

The method of the present invention can be used in a number of operations. For instance, the method of the present invention can be used in conjunction with sand consolidation procedures, gravel packing procedures, secondary recovery operations, and acidizing or fracturing operations. In these operations, the organic copolymers can be used to prevent or reduce the migration of fines in the subterranean formation. This results in a greater permeability in the formation and a greater permeability increase during acidizing or fracturing operations. The present invention is further exemplified by the examples below which are presented to illustrate certain specific embodiments of this invention, but are not intended to be construed so as to be restrictive of the spirit and scope thereof.

EXAMPLES

A number of tests were performed to evaluate the effectiveness of various copolymers as fine stabilizers. The following monomer unit abbreviations are used herein:

TABLE I

| Monomer Unit | Abbreviation |
|---|---|
| methacrylamidopropyl-4,8-diaza-4,4,8,8-tetramethyl-6-hydroxy-nonamethylene dichloride | MDTHD |
| dimethylaminoethyl methacrylate | DMAEMA |
| methyl chloride salt of dimethyl-aminoethyl methacrylate | DMAEMA.CH$_3$Cl |
| N,N—dimethylacrylamide | NNDMAm |
| dimethylaminopropyl methacrylamide | DMAPMA |
| N—hydroxymethylacrylamide | NHMAm |
| 2-acrylamido-2-methylpropane-sulfonic acid | AMPSA |
| methacrylamidopropyltri-methylammonium chloride | MAPTAC |

The following copolymers were utilized in the tests:

TABLE II

| Copolymer | Copolymer Designation |
|---|---|
| 33.3 mole percent MDTHD/66.7 mole percent NNDMAm, treatment fluid viscosity 1.6 cps | A |
| 66.7 mole percent MDTHD/33.3 mole percent NNDMAm, treatment fluid viscosity 1.9 cps | B |
| 66.7 mole percent MDTHD/33.3 mole percent, NNDMAm, treatment fluid viscosity 2.2 cps | C |
| 90.0 mole percent MDTHD/10.0 mole percent NHMAm | D |
| 66.7 mole percent MDTHD/33.3 mole percent DMAEMA | E |
| 50.0 mole percent MDTHD/50.0 mole percent DMAEMA, treatment fluid viscosity 2.6 cps | F |
| 33.3 mole percent MDTHD/66.7 mole percent DMAEMA, treatment fluid viscosity 1.7 cps | G |
| 70.0 mole percent MDTHD/30.0 mole percent DMAPMA | H |
| 85-90 mole percent MDTHD/10-15 mole percent DMAPMA | I |
| 90.0 mole percent MTDHD/10.0 mole percent DMAPMA | J |
| 95.0 mole percent MDTHD/5.0 mole percent DMAPMA | K |
| 75.0 mole percent DMAEMA.CH$_3$Cl/25.0 mole percent DMAEMA, treatment fluid viscosity 2.6 cps | L |
| 50.0 mole percent DMAEMA.CH$_3$Cl/50.0 mole percent DMAEMA, treatment fluid viscosity 2.6 cps | M |
| 50.0 mole percent DMAEMA.CH$_3$Cl/50.0 mole percent DMAEMA, treatment fluid viscosity 5.1 cps | N |
| 25.0 mole percent DMAEMA.CH$_3$Cl/75.0 mole percent DMAEMA, treatment fluid viscosity 2.6 cps | O |
| 10.0 mole percent DMAEMA.CH$_3$Cl/90.0 mole percent DMAEMA, treatment fluid viscosity 2.7 cps | P |
| 28.6 mole percent DMAEMA.(CH$_3$)$_2$SO$_4$/71.4 mole percent DMAEMA | Q |
| 45.5 mole percent DMAEMA.CH$_3$Cl/45.5 mole percent DMAEMA/9.0 AMPSA, treatment fluid viscosity 1.9 cps | R |
| 45.5 mole percent DMAEMA.CH$_3$Cl/45.5 mole percent DMAEMA/9.0 mole percent NNDMAm, treatment fluid viscosity 2.0 cps | S |
| 45.5 mole percent DMAEMA.CH$_3$Cl/45.5 mole percent DMAEMA/9.0 mole percent MAPTAC, treatment fluid viscosity 2.0 cps | T |
| 33.3 mole percent DMAEMA.CH$_3$Cl/33.3 mole percent DMAEMA/33.33 mole percent MAPTAC, treatment fluid viscosity 1.8 cps | U |

Treatment fluid viscosity was measured using a Brookfield Model LVT viscometer using a UL adapter at 30 rpms. The copolymer solvent was aqueous two percent (by weight) ammonium chloride. The temperature at the time of the measurement was 74° F.

The molecular weight of the copolymers used in the tests was in the range of from about 50,000 to about 1,000,000.

EXAMPLE I

A. Test Equipment and Procedure

The test equipment used in the tests of Example I was a TEFLON sleeved test chamber having a diameter of about 2.5 cm at the bottom of the chamber and a diameter of about 2.6 cm at the top of the chamber. The chamber design insured that, under modest applied pressure, fluid injected during the test would flow through the test sand rather than around the test sand. The test sand comprised 100 grams of a mixture of 85 percent by weight 70-170 U.S. mesh sand and 15 percent by weight silica fine particles. The silica fine particles had a median particle diameter of 22.4 microns and surface area of 1.20 m$^2$/gram. A 100 U.S. mesh screen was placed at the base of the chamber to hold the larger particles in place.

The test chamber and fluid reservoir were heated to about 145° F. The first fluid injected into the top of the chamber during the tests comprised 236 cc of an aqueous solution containing 2 percent by weight of ammonium chloride and 0.25 percent by weight of the copolymer. The injection pressure was 5 psia.

Included in these tests were treatments in which no copolymer was added to the fluid. After completion of the injection of the first fluid, the injection pressure was increased to 40 psig and 500 cc of fresh water was injected. The fresh water treatment was optionally followed by an injection at 40 psig of 400 cc of an aqueous fluid comprising 15 percent by weight of hydrochloric acid and an injection at 40 psig of 500 cc of fresh water.

The effluent of each treatment was collected and filtered through a tared piece of 0.45 micron filter paper. The solids from the effluent were collected in the filter paper, dried and weighed. The results of these tests are shown in Table III.

TABLE III

| TEST NO. | COPOLYMER USED | SILICA FINES PRODUCTION (% BY WEIGHT OF CONTROL EXPERIMENT) | |
|---|---|---|---|
| | | Before 15% HCl | After 15% HCl |
| 1 | None* | 100.0 | 100.0 |
| 2 | A | 38.1 | 32.4 |
| 3 | B | 42.3 | 35.3 |
| 4 | C | 19.1 | 20.6 |
| 5 | D | 14.3 | 26.4 |
| 6 | E | 23.8 | 23.5 |
| 7 | F | 14.3 | 23.5 |
| 8 | G | 14.3 | 23.5 |
| 9 | H | 9.5 | ** |
| 10 | I | 19.1 | ** |
| 11 | J | 9.5 | ** |
| 12 | K | 9.5 | ** |
| 13 | L | 28.6 | 32.4 |
| 14 | M | 38.1 | 29.4 |
| 15 | N | 23.8 | 35.3 |
| 16 | O | 23.8 | 26.5 |
| 17 | P | 23.8 | 29.4 |
| 18 | Q | 23.8 | ** |
| 19 | R | 42.9 | 38.2 |
| 20 | S | 33.3 | 29.4 |
| 21 | T | 23.8 | 29.4 |
| 22 | U | 33.3 | 29.5 |

*Control Experiment
**Tests Not Performed

Test No. 1 was a control experiment to determine the amount of silica fines produced in the absence of any copolymer. An amount of 0.21 g of fines was produced during the injection of 500 cc of fresh water and a total of 0.34 g of fines were produced after injection of the 15% hydrochloric acid and followed by fresh water. These amounts were defined, for calculations purposes, as 100% fines production.

From Table III, it can be seen that the binary and ternary copolymers used in the method of the present invention are very effective as silica fine stabilizers even after exposure of the copolymer to an aqueous 15 percent by weight hydrochloric acid solution.

EXAMPLE II

A series of tests were performed in the same manner as Example I except the copolymers were evaluated as fine stabilizers for calcite and hematite. The calcite had a median particle diameter of 8.9 microns and a surface area of 10.98 m$^2$/gram. The hematite had a median particle diameter of 4.4 microns and a surface area of 6.44 m$^2$/gram. The results of these tests are shown in Table IV.

TABLE IV

| TEST NO. | COPOLYMER USED | FINES PRODUCTION (% OF CONTROL EXPERIMENT) | |
|---|---|---|---|
| | | Calcite | Hematite |
| 1 | None* | 100.0 | 100.0 |
| 2 | A | 77.8 | 88.9 |
| 3 | B | ** | 72.2 |
| 4 | E | ** | 100.0 |
| 5 | G | ** | 94.4 |
| 6 | H | 37.2 | 57.1 |
| 7 | L | 114.6 | 100.0 |
| 8 | O | 81.1 | 77.8 |
| 9 | R | ** | 100.0 |
| 10 | S | ** | 85.7 |

*Control Experiment
**Tests Not Performed

The results of the tests reported in Table IV show that the copolymers, with the exception of copolymer L, were effective in reducing the production of fines from a test column containing 15 percent by weight calcite fine particles.

The results of the tests also show that the copolymers, with the exception of copolymers L, E, and R, were effective hematite fines stabilizers.

The reason the results of these tests showed that copolymer L did not reduce calcite fine production and copolymers L, E, and R did not reduce hematite fine production is not understood.

Although the standard tests procedures were used in evaluating copolymer L as a calcite fines stabilizer and copolymer L, E, and R as a hematite fines stabilizer, it is possible that the results observed were due to procedure problems in performing these experiments. Potential procedure problems include: increasing the injection pressure from 5 psia to 40 psig too rapidly causing pressure surges which disturbed the sand pack in turn causing additional fines migration over what was observed in the controlled tests; temporarily increasing the injection pressure above 40 psig; difficulties in packing the test columns; and a hole in the 100 U.S. mesh screen allowing additional sollids to pass through the screen.

EXAMPLE III

A series of tests were performed in the same manner as Example I except that the treatment solvent was a strong acid solution comprising aqueous 15% hydrochloric acid.

The results of these tests are shown in Table V.

TABLE V

| Test No. | Copolymer Used | Silica Fines Production (% of Control Experiment) |
|---|---|---|
| 33 | None* | 100.0 |
| 34 | F | 20.7 |
| 35 | G | 27.6 |
| 36 | H | 27.6 |

*Control Experiment

The results in Table V indicate that the copolymers tested were quite effective when the treatment solvent was a strong acid.

The invention is not limited to the abovedescribed specific embodiments thereof; it must be understood therefore, that the detail involved in the descriptions of these embodiments is presented for the purposes of illustration only, and that reasonalbe variations and modifications, which will be apparent to those skilled in the art, can be made of this invention without departing from the spirit and scope thereof.

What is claimed is:

1. A method of preventing or reducing the migration of fines in a permeable Subterranean Formation comprising:

contacting said fines in said permeable structure with an effective amount of an organic copolymer having recurring structural monomer units formed in a random fashion of the formula:

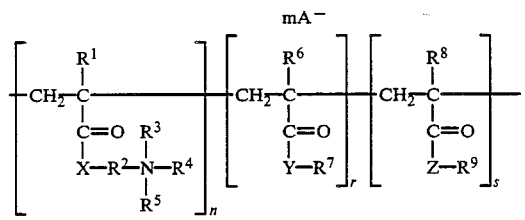

I  II  III wherein

X is independently selected from the group consisting of oxygen and NH;

$R^1$, $R^6$, and $R^8$ are independently selected from the group consisting of hydrogen and methyl;

$R^2$ is an alkylene group having 1 to about 4 carbon atoms;

$R^3$ and $R^5$ are independently selected from the group consisting of methyl and ethyl;

$R^4$ is optionally present and is selected from the group consisting of:

(1) an alkyl group having from 1 to about 6 carbon atoms; and (2) a quaternary ammonium group having the general formula:

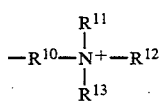

wherein:

$R^{10}$ is selected from the group consisting of an alkylene group having from about 2 to about 6 carbon atoms and a substituted alkylene group having from about 2 to about 6 carbon atoms and containing a hydroxyl group or from 1 to about 3 ether groups;

$R^{11}$, $R^{12}$, and $R^{13}$ are independently selected from the group consisting of methyl and ethyl;

Y is selected from the group consisting of oxygen and $NR^{16}$ wherein $R^{16}$ is selected from the group consisting of hydrogen, methyl and ethyl;

$R^7$ is selected from the group consisting of an alkyl group having from 1 to about 3 carbon atoms; and,

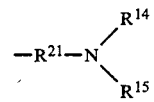

wherein:

$R^{14}$ and $R^{15}$ are independently selected from the group consisting of methyl and ethyl; and, $R^{21}$ is selected from the group consisting of methylene, ethylene, and trimethylene;

$R^9$ is selected from the group consisting of hydrogen, an alkyl group containing 1 to about 4 carbon atoms, a substituted alkyl group having from 1 to about 4 carbon atoms and containing a hydroxyl group, a carboxyl group, or $-SO_3J$ wherein J is selected from the group consisting of hydrogen, sodium and potassium, and,

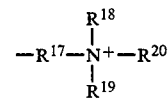

wherein $R^{17}$ is selected from the group consisting of methylene, ethylene, and trimethylene; and, $R^{18}$, $R^{19}$, and $R^{20}$ are independently selected from the group consisting of methyl and ethyl;

Z is selected from the group consisting of oxygen and NH and provided further when Z is oxygen, $R^9$ may further be selected from the group consisting of sodium and potassium;

A is an anion selected from the group consisting of chloride, bromide, iodide, methyl sulfate, and sulfate;

m is an integer equal to the number of anions required to maintain electronic neutrality;

n, r, and s are integers the sum of which equals the total number of monomer units in the copolymer required to give a molecular weight in the range of from about 50,000 to about 1,000,000; and, monomer unit I is present in the range of from about 25 to about 95 mole percent in the copolymer; monomer unit II is present in the range of from about 5 to about 75 mole percent of the copolymer; and, monomer unit III is present in the range of from about 0 to about 35 mole percent of the copolymer.

2. The method recited in claim 1 wherein said copolymer is selected from the group consisting of

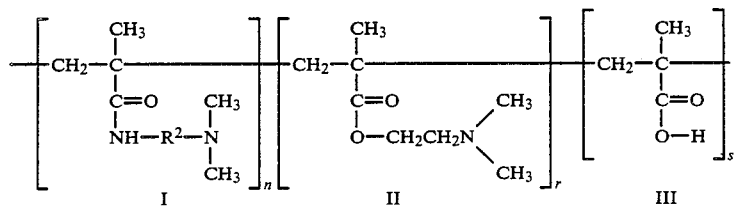

wherein R² is selected from the group consisting of ethylene and methylene; and,

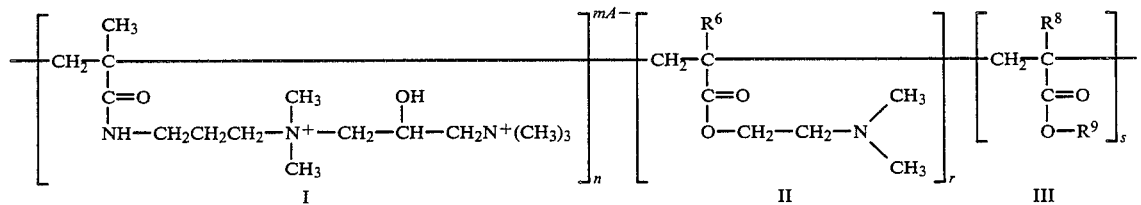

wherein:
R⁶ and R⁸ are independently selected from the group consisting of hydrogen and methyl;
R⁹ is selected from the group consisting of hydrogen and sodium;
A is anion selected from the group consisting of chloride, bromide, iodide, methyl sulfate and sulfate; and,
m is an integer equal to the number of anions required to maintain electronic neutrality.

3. The method recited in claim 1 wherein monomer unit I is selected from the group consisting of dimethylaminoethyl methacrylate, the methyl chloride salt of dimethylaminoethyl methacrylate, and methacrylamido-4,8-diaza-4,4,8,8-tetramethyl-6-hydroxynonamethylene dichloride.

4. The method recited in claim 3 wherein monomer unit II is selected from the group consisting of dimethylaminoethyl methacrylate, dimethylaminopropyl methacrylamide, dimethylamidopropyl methacrylamide and dimethylacrylamide.

5. The method recited in claim 4 wherein monomer unit III is selected from the group consisting of methacrylic acid and 2-acrylamido-2-methylpropane sulfonic acid.

6. The method recited in claim 1 wherein organic copolymer is selected from the group consisting of

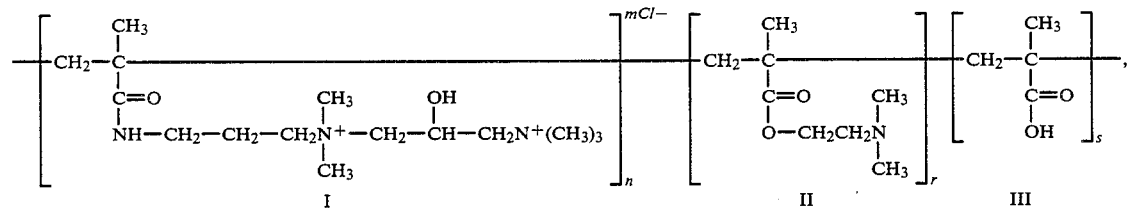

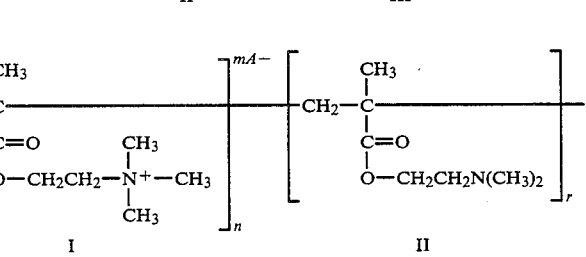

wherein A is selected from the group consisting of chloride and methyl sulfate; and,

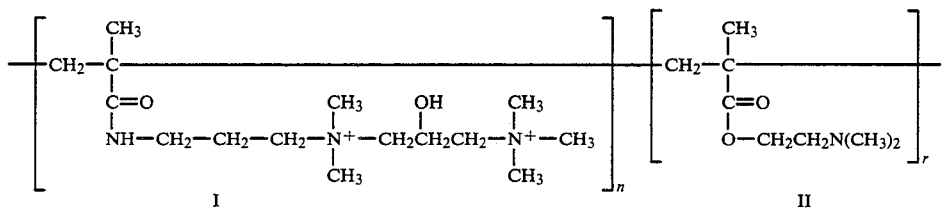

and mixtures thereof.

7. The method recited in claim 1 wherein said molecular weight is in the range of from about 100,000 to about 400,000 and monomer unit I is present in an amount of about 70 mole percent of the copolymer, monomer unit II is present in an amount of about 27 mole percent of the copolymer and monomer unit III is present in an amount of about 3 mole percent of the copolymer.

8. The method recited in claim 7 wherein said copolymer is dispersed in a carrier fluid.

9. The method recited in claim 8 wherein said carrier fluid comprises from about 0.1 to about 40.0 percent by weight of a salt and said salt is selected from the group consisting of an alkali metal halide an alkaline earth metal halide, an ammonium halide, and mixtures thereof.

10. The method recited in claim 9 wherein said copolymer is present in said carrier fluid in the range of from about 0.01 to about 5.0 percent by weight of the carrier fluid.

11. The method recited in claim 10 wherein said carrier fluid further comprises a mineral acid selected from the group consisting of hydrofluoric acid, hydrochloric acid and mixtures thereof.

12. The method recited in claim 1 wherein said method is used in conjunction with a secondary recovery operation.

13. A method of treating an earthen formation comprising fines to reduce the loss of permeability in said formation because of the migration of the fines comprising:

contacting said formation with an effective amount of an organic copolymer having recurring structural monomer units formed in a random fashion of the formula:

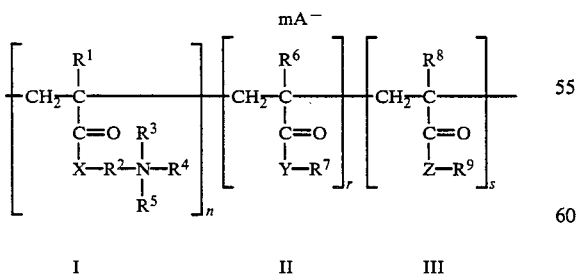

wherein:

X is selected from the group consisting of oxygen and NH;

$R^1$, $R^6$, and $R^8$ are independently selected from the group consisting of hydrogen and methyl;

$R^2$ is an alkylene group having 1 to about 4 carbon atoms;

$R^3$ and $R^5$ are independently selected from the group consisting of methyl and ethyl;

$R^4$ is optionally present and is selected from the group consisting of (1) an alkyl group having from 1 to about 6 carbon atoms; and (2) a quaternary ammonium group having the general formula:

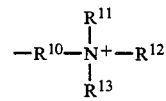

wherein:

$R^{10}$ is selected from the group consisting of an alkylene group having from about 2 to about 6 carbon atoms and a substituted alkylene group having from about 2 to about 6 carbon atoms and containing a hydroxyl group or from 1 to about 3 ether groups;

$R^{11}$, $R^{12}$, and $R^{13}$ are independently selected from the group consisting of methyl and ethyl;

Y is selected from the group consisting of oxygen and $NR^{16}$ wherein $R^{16}$ is selected from the group consisting of hydrogen, methyl and ethyl;

$R^7$ is selected from the group consisting of an alkyl group having from 1 to about 3 carbon atoms; and,

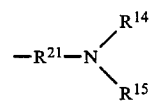

wherein:

$R^{14}$ and $R^{15}$ are independently selected from the group consisting of methyl and ethyl;

$R^{21}$ is selected from the group consisting of methylene, ethylene, and trimethylene;

$R^9$ is selected from the group consisting of hydrogen, an alkyl group containing 1 to about 4 carbon atoms, a substituted alkyl group having from 1 to about 4 carbon atoms and containing a hydroxyl group, a carboxyl group, or —$SO_3J$ wherein J is selected from the group consisting of hydrogen, sodium and potassium; and,

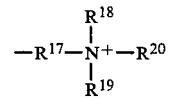

wherein
R[17] is selected from the group consisting of methylene, ethylene, and trimethylene; and,
R[18], R[19], and R[20] are independently selected from the group consisting of methyl and ethyl;
Z is selected from the group consisting of oxygen and NH are provided further when Z is oxygen,
R[9] may further be selected from the group consisting of hydrogen, sodium, and potassium; and,
A is an anion selected from the group consisting of chloride, bromide, iodide, methyl sulfate, and sulfate;
m is an integer equal to the number of anions required to maintain electronic neutrality;
n, r, and s are integers the sum of which equals the total number of monomer units in the copolymer required to give a molecular weight in the range of from about 50,000 to about 1,000,000; and,
monomer unit I is present in the range of from about 25 to about 95 mole percent in the copolymer;
monomer unit II is present in the range of from about 5 to about 75 mole percent of the copolymer; and,
monomer; unit III is present in the range of from about 0 to about 35 mole percent of the copolymer.

14. The method recited in claim 13 wherein said copolymer is selected from the group consisting of wherein:
R[6] and R[8] are independently selected from the group consisting of hydrogen and methyl;
R[9] is selected from the group consisting of hydrogen and sodium;
A is an anion selected from the group consisting of chloride, bromide, iodide, methyl sulfate and sulfate; and,
m is an integer equal to the number of anions required to maintain electronic neutrality.

15. The method recited in claim 13 wherein monomer unit I is selected from the group consisting of dimethylaminoethyl methacrylate, the methyl chloride salt of dimethylaminoethyl methacrylate, and methacrylamido-4,8-diaza-4,4,8,8-tetramethyl-6-hydroxynonamethylene dichloride.

16. The method recited in claim 15 wherein monomer unit II is selected from the group consisting of dimethylaminoethyl methacrylate, dimethylaminopropyl methacrylamide, dimethylamidopropyl methacrylamide, and dimethylacrylamide.

17. The method recited in claim 16 wherein monomer unit III is selected from the group consisting of methacrylic acid and 2-acrylamido-2-methylpropane sulfonic acid.

18. The method recited in claim 13 wherein organic

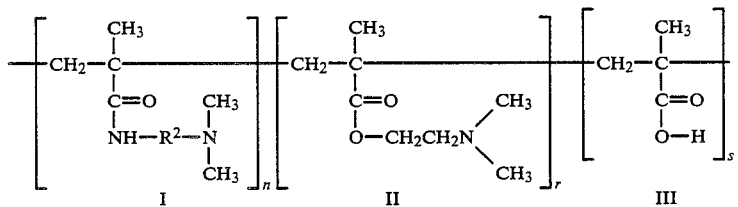

wherein R[2] is selected from the group consisting of ethylene and methylene; and, polycationic copolymer is selected from the group consisting of

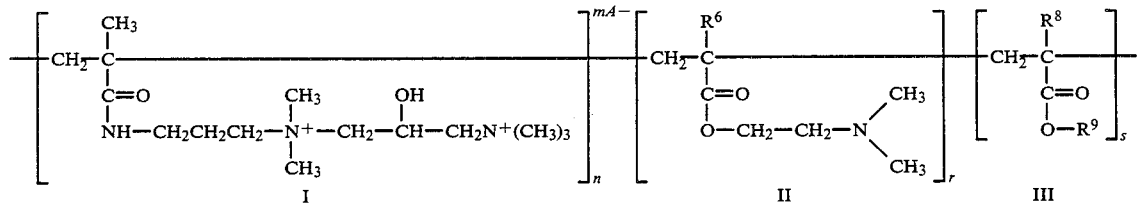

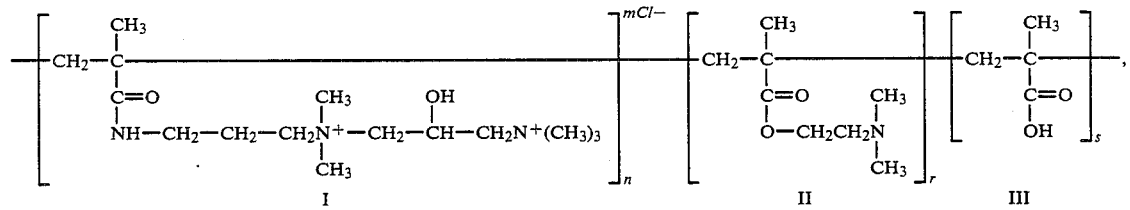

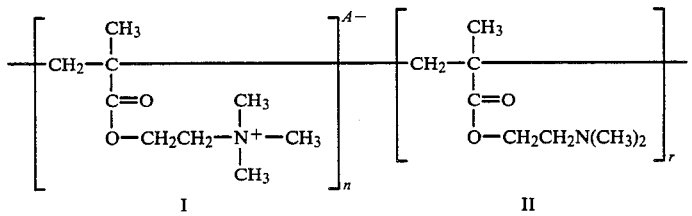

wherein A is selected from the group consisting of chloride and methyl sulfate;

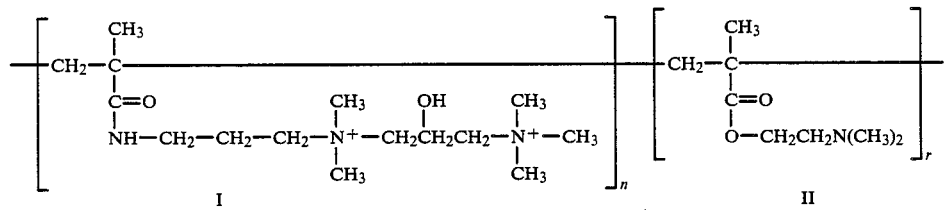

and mixtures thereof.

19. The method recited in claim 17 wherein said copolymer is dispersed in a carrier fluid and the carrier fluid comprises from about 0.1 to about 40.0 percent by weight of a salt and said salt is selected from the group consisting of an alkali metal halide, an alkaline earth metal halide, an ammonium halide, and mixtures thereof.

* * * * *